April 23, 1974     T. L. THOMPSON     3,806,323
APPARATUS FOR GENERATING OXYGEN
Original Filed April 28, 1971

United States Patent Office 3,806,323
Patented Apr. 23, 1974

3,806,323
APPARATUS FOR GENERATING OXYGEN
Tommy Lewis Thompson, Melbourne, Fla., assignor to Dow Chemical Investment and Finance Corporation, Midland, Mich.
Original application Apr. 28, 1971, Ser. No. 138,326, now Patent No. 3,725,156. Divided and this application Nov. 2, 1972, Ser. No. 303,112
Int. Cl. B01j 7/00
U.S. Cl. 23—281                                                          8 Claims

ABSTRACT OF THE DISCLOSURE

A structure and method for activating ignition cone compositions with water preferably for activating chlorate candle type oxygen generators. An ignition cone composition of alkaline metal or alkaline earth metal iodides or oxyiodides in combination with a principal oxidizer of an alkaline metal monoxide and preferably an auxiliary oxidizer consisting of alkaline metal and alkaline earth metal peroxide and chlorates is included as a separate top layer in compressing a chemical oxygen generator composition and is activated by water released from a fracturable vial.

RELATED APPLICATION

This application is a division of the Tommy Lewis Thompson U.S. patent application Ser. No. 138,326, filed Apr. 28, 1971, entitled "Ignition Cone," now U.S. Pat. No. 3,725,156, issued Apr. 3, 1973.

FIELD OF THE INVENTION

This invention relates to a structure and a method for initiating an ignition cone composition with water. Particularly the composition contains a metal source of iodides and oxyiodides for initiating chemical oxygen generators without decomposing into toxic gas or having unsafe combustion characteristics and activated by release of water from a fracturable vial in the generator.

DESCRIPTION OF THE PRIOR ART

Ignition cone compositions which can reliably start a chemical oxygen generator without introducing undesirable contaminants into the gas stream are extremely rare, if existent at all.

U.S. Pat. 2,469,414 describes an ignition cone made of the same materials as the candle proper, but the iron and glass percentages are increased with a corresponding decrease in chlorate. The gas formed contains impurities which are removed by filtration.

U.S. Pat. 3,293,187 teaches an ignition cone consisting of a disc or pellet composed of powdered manganese and lithium peroxide. While the gas purity on ignition is not discussed, it is known that it is impure.

W. H. Schecter, in "Chlorate Candles as a Source of Oxygen," Industrial and Engineering Chemistry, vol. 42, page 2348, November 1950, states that the high temperatures in the cone cause "violent ebullition and spattering of the molten material," and that "the top of the candle may reach red heat unless sufficient heat capacity is present."

J. Littman, in "Research on Soduim Chlorate Candles for the Storage and Supply of Oxygen for Space Exploration," NASA SP-234, pages 291–330, 1970, describes an ignition cone of the following composition:

|  | Percent | |
|---|---|---|
|  | Primary | Secondary |
| Fe | 25 | 30 |
| BaO$_2$ | 66 | 15 |
| Fiberglass | 9 | 25 |
| NaClO$_3$ | 0 | 30 |
| Amount used | [1] 2 | [1] 12 |

[1] Grams.

In commenting on these mixtures, he states:
"As with the basic standard formula NaClO$_3$ candle disscused previously, impurities in the chemicals blended into the primary and secondary formulations produced contaminants in the product oxygen stream. This included CO and CO$_2$ contaminants from impurities in the iron powder fuel and the barium peroxide-chlorine evolution suppressant."

SUMMARY OF THE INVENTION

Objectives

An object of this invention is to provide a water initiated structure for activating oxygen generators which are incapable of igniting tin plate and yet develop sufficient heat to cause the ignition of most chemical oxygen generators.

Another object of this invention is to provide a method of activating chemical oxygen generator with water.

Another object of the invention is to provide an ignition composition in combination with a sealed water source that is easily tapped to release water for activating the composition.

A still further object of this invention is to provide a structure for activating chemical oxygen generators with water.

Another object of the invention is to provide a non-liquefying ignition cone activated by water.

A specific object of the invention is to provide an ignition cone of the formulation disclosed and claimed in the aforesaid parent application S.N. 138,326 in a chlorate candle oxygen generator cell with a fracturable water filled via adapted to be broken from outside of the cell to activate the composition for activating the chlorate candle.

Other further objects and features of this invention will be obvious from the following description.

BROAD STATEMENT OF THE INVENTION

It has now been found that the alkali metal and alkaline earth metal iodides and oxyiodides in combination with one or more alkaline metal mono-oxides as the main oxidizer and usually an auxiliary oxidizer comprising one or more alkaline metal and alkaline earth metal peroxides, and chlorates including the perchlorates, produce a most effective ignition cone, when ignited, is particularly suited for chemical oxygen generators. More particularly, when an oxidant of the group consisting of 10% to 60% by weight of one or more alkaline metal and alkaline earth metal iodides, preferably sodium or potassium iodide; and 10% to 85% by weight of one or more alkaline metal and alkaline earth metal oxyiodides, preferably sodium or potassium iodate are combined with 10% to 70% by weight of an alkaline metal oxidizer, preferably sodium monoxide and, dependent upon the oxidant utilized, 10% to 70% by weight for the iodide oxidant and 0% to 70% by weight of an auxiliary oxidizer, preferably sodium peroxide, sodium chlorate, or barium chlorate, a most effective, cool burning, odor-free, non-toxic gas emitting ignition cone, especially suitable for chemical oxygen generators is produced. As will be seen from the description as it proceeds, this composition is far superior to any previously used as an ignition cone for said generators, and, in addition, it is water initiatable, which is most desirable when explosive environments are involved.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

For a fuller understanding of the nature and objects of the invention, reference should be had to the attached drawing and the following detailed examples.

GENERAL DESCRIPTION OF THE DRAWING

Figure 1:
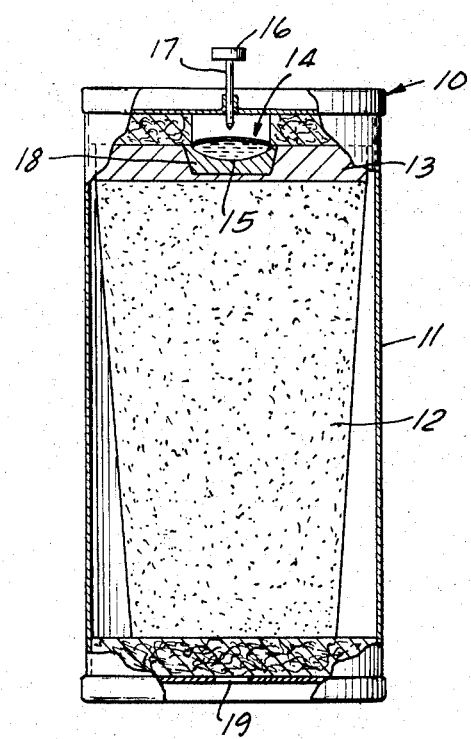
FIG. 1 is a somewhat diagrammatic vertical cross sectional view of an oxygen generator with an ignition cone activated by a fracturable water filled vial.

The oxygen generator 10 of FIG. 1 includes a tin plated steel can 11 providing a casing for a compacted sodium chlorate candle 12 covered with an ignition cone composition 13. A glass vial 14 filled with water 15 rests on or is embedded in the ignition cone 13. A button 16 on top of the can 11 is adapted to be depressed to move the pin or rod 17 into the vial 14 causing it to rupture and release the water 15 to the cone 13. If desired, a first fire composition 18 can be associated with the vial 14 composed of the composition set forth in Example I hereof. Oxygen from the candle 13 is released from the can 11 through an orifice such as 19 in the bottom of the can.

Figure 2:
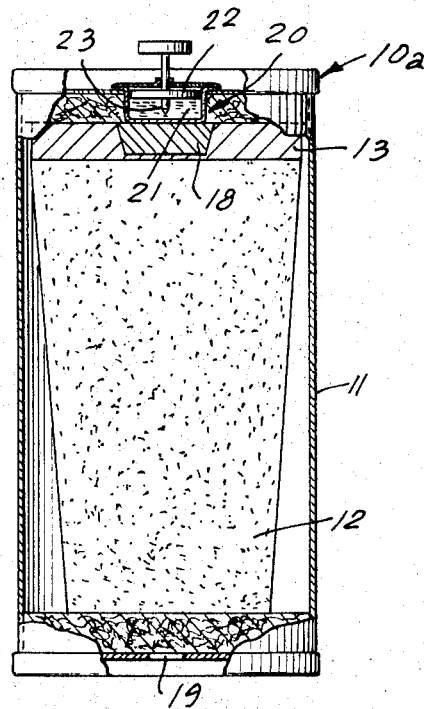
FIG. 2 is a view similar to FIG. 1 wherein the cone is actuated by a water filled syringe.

In the modification of FIG. 2 the oxygen generator 10a has the same constituent components as the generator 10, but the vial 14 is replaced with a syringe 20 filled with water 21 and having a plunger 22 which will pierce the syringe body as by means of a pin 23 to release the water 21 to the first fire material 18 and cone 13.

DETAILED DESCRIPTION OF THE PREFERRED EMBODIMENTS

Example I

The following cone composition for a chemical oxygen generator is formulated as a first or primary, and a second or secondary composition:

|  | Percent by weight | |
| --- | --- | --- |
|  | Primary | Secondary |
| $NaClO_3$ | 37 | 90 |
| $Na_2O$ | 30 | 6 |
| $Na_2O_2$ | 3 | 4 |
| $NaIO_3$ | 30 | 0 |

The primary composition is poured loosely into the bottom of the mold for the chemical oxygen generator and leveled. Then, the secondary composition is poured in and leveled. Finally, the generator composition is poured in and the entire generator pressed. Since the cone covers the entire top of the generator, ignition will be quite even.

Ignition or initiation of the cone may be accomplished by the use of a water filled fracturable glass vial (15 on the drawing) containing about 0.1 ml. $H_2O$ in association with 2.5 gms. of a first fire composition (18 on the drawing) of:

| | Percent by weight |
| --- | --- |
| $NaClO_3$ | 18 |
| $NaIO_3$ | 38 |
| $Na_2O$ | 44 |

The vial is broken by depressing a button (16 on the drawing) on top of the generator. A miniature hypodermic-like syringe (20 on the drawing) built into the generator could also be used.

A gas analysis a short time after ignition, when only the cone is ignited, will reveal the following:

| | | |
| --- | --- | --- |
| $Cl_2$ | p.p.m. | 0 |
| CO | p.p.m. max. | 10 |
| $CO_2$ | p.p.m. | 0 |
| $H_2O$ | mg./l. | 7 |

Gas meets U.S.P. with exception of water vapor.

Other observations will be as follows:

Slow burning
Non-liquefying
Odor Free
Incapable of igniting tin-plate

The first fire and the cone composition above will form a white hard ash which is only partially soluble in water.

Example II

By enriching the primary composition with sodium iodate, the secondary composition of Example I may be completely eliminated. The resultant composition would be as follows:

| | Percent by weight |
| --- | --- |
| $NaClO_3$ | 9.9 |
| $Na_2O$ | 32.7 |
| $Na_2O_2$ | 2.0 |
| $NaIO_3$ | 55.4 |

Less of the above composition could even be used as the cone. And, it is water-initiatable.

Example III

Ten grams of the following cone formulation can ignite a generator by water activation without requiring a first fire or secondary cone:

| | Percent by wt. |
| --- | --- |
| $NaIO_3$ (reagent) | 54.4 |
| $Na_2O$ (commercial, powdered) | 34.1 |
| $Ba(ClO_4)_2$ (lab synthesized) | 11.5 |

Example IV

In a situation where the $NaIO_3$ is not as pure as reagent grade, the addition of some zinc peroxide aids in accomplishing satisfactory performance. The following is a typical composition of such:

| | Percent by wt. |
| --- | --- |
| $NaIO_3$ (purified powder) | 47.9 |
| $Na_2O$ (powdered, commercial) | 33.8 |
| $Ca(ClO_4)_2$ (lab synthesized) | 7.2 |
| $ZnO_2$ (tech 55% pure) | 11.1 |

Example V

Mixtures involving the alkaline earth iodates are also all quite active, igniting in compressed form with $H_2O$. A typical example is:

| | Percent by wt. |
| --- | --- |
| $Sr(IO_3)_2$ | 57.8 |
| $Na_2O$ | 32.8 |
| $Sr(ClO_4)_2$ | 9.4 |

A ten gram, one inch diameter pellet ignites with 0.1 ml. $H_2O$, and reacts to completion in 12 seconds.

The mechanism of the reactions of this invention is not completely clear.

With respect to use of iodate as the oxidant and limiting this discussion to sodium iodate, the reaction is thought to be:

$$\tfrac{2}{3}NaIO_3 + 2Na_2O \rightarrow Na_5IO_5 + \tfrac{1}{3}NaI \quad (I)$$

It seems likely that sodium paraperiodate ($Na_5IO_6$) is formed as follows:

$$NaIO_2 + 2Na_2O + \tfrac{1}{3}NaClO_3 \rightarrow Na_5IO_6 \tfrac{1}{3}NaCl \quad (II)$$

or $$NaIO_3 + Na_2O + Na_2O_2 \rightarrow Na_5IO_6 \quad (III)$$

or $$\tfrac{2}{3}NaIO_2 + 2Na_2O \rightarrow Na_5IO_6 + \tfrac{1}{3}NaI \quad (IV)$$

There are a number of periodate saltes which could also be formed, such as:

meta-($NaIO_4$)
    dimeso-($Na_4I_2O_9$)
    meso-($Na_3IO_5$)
    dipara-($Na_8I_2O_{11}$)
    diortho-($Na_{12}I_2O_{13}$)
    ortho-periodate ($Na_7IO_7$)

The meta-periodate ($NaIO_4$) reacts with $Na_2O$ with an incandescent glow and, assuming the para-periodate to be the product, the reaction would be:

$$NaIO_4 + 2Na_2O \rightarrow Na_5IO_6 \quad (V)$$

Thus, it seems likely that sodium para-periodate is the primary iodine compound formed.

With respect to iodide as the oxidant and limiting this discussion to sodium iodide, the reaction, which is thought to be:

$$NaIO_3 \rightarrow NaI + \tfrac{3}{2}O_2 \quad (VI)$$

is endothermic, therefore, the reverse will be exothermic. It follows then that a more highly exothermic reaction will occur if the sodium iodate in Equation II is replaced by sodium iodide as follows:

$$NaI + 2Na_2O + \tfrac{2}{3}NaClO_3 \rightarrow Na_5IO_6 + \tfrac{2}{3}NaCl \quad (VII)$$

Experimentally, it will be found that the iodide provides more rapid and vigorous ignition than do their iodate counterparts. However, the iodide formulations are less sensitive, or more difficult to ignite than their iodate counterparts. It is also more difficult to formulate iodide compositions to give pure oxygen. Fortunately, the iodides are less expensive than the iodates.

The alkaline earth metal chlorates and perchlorates as auxiliary oxidizers are to be avoided in iodide formulations when pure oxygen is required. The smaller heat of formation of the iodides as compared to the iodates leads to higher heats of reaction, and consequently, higher temperatures in the reaction. $Na_5IO_6$ decomposes at 800° C. (see page B-158, Handbook of Chemistry and Physics, 50th ed. 1969) so the hotter iodide formulations tend to produce impure oxygen as they approach this temperature.

With respect to Equation II, the periodate can replace the iodate, but it is more expensive. Also, the chlorate may be replaced with perchlorate.

Depending on the speed of ignition required, the concentration ranges may be:

| | Percent by weight |
|---|---|
| $NaClO_3$ | 0 to 70 |
| $Na_2O$ | 10 to 70 |
| $NaIO_3$ | 10 to 85 |

Sodium peroxide ($Na_2O_2$) need only be used to suppress free halogen formation. Usually, no more than 5% is required.

While the cone will function over a very wide range of compositions, consideration of economics, oxygen liberation, and temperature will usually narrow the above ranges. For instance, the relative expense of sodium iodate tends to restrict its use. In contrast, sodium chlorate is low in cost. It appears to furnish most of the oxygen liberated by the cone. So, concentrations heavy in chlorate would be favored. From the temperature standpoint, visual observation of the incandescence of the reaction reveals that the peak temperatures appear to occur when the formulation is stoichiometric. (Equation II.) The stoichiometric concentration would be:

| | Percent by weight |
|---|---|
| $NaIO_3$ | 55.4 |
| $Na_2O$ | 34.7 |
| $NaClO_3$ | 9.9 |

The iodides and oxyiodides that may be used as the oxidants are those of the alkaline metals and alkaline earth metals. Typical of these are sodium iodide, potassium iodide, sodium iodate, potassium iodate, lithium iodate, magnesium iodate, barium iodate, calcium iodate, strontium iodate, sodium periodate, potassium periodate, and mixtures thereof. From 10% to 60% by weight of iodide and 10% to 85% by weight of the oxyiodide is the usual concentration range. Pronounced differences in cone activity are noted by the grade of iodide or oxyiodide used. Reagent grade is better than purified powder, which, in turn, is better than production grade. As noted in Example IV, the addition of zinc peroxide is helpful to improve the performance of production grade material. The size of granules used also affects the rate of the reaction and its completeness—the smaller the size, the quicker the rate and the greater possibility of obtaining a complete reaction.

The principal oxidizer that is used should be one or more of the alkaline metal mono-oxides, such as sodium monoxide or potassium monoxide. The concentration range should be from 10% to 70% by weight.

The auxiliary oxidizer that must be used when iodine is used as the oxidant and that may be used when oxyiodide is used as the oxidant should be one or more of the alkaline metal and alkaline earth metal oxides and chlorates including the chlorates and perchlorates. Typical auxiliary oxidizers are sodium peroxide, potassium peroxide, lithium peroxide, barium peroxide, calcium peroxide, zinc peroxide, sodium superoxide, potassium superoxide, sodium chlorate, potassium chlorate, barium chlorate, sodium perchlorate, lithium perchlorate, potassium perchlorate, barium perchlorate, magnesium perchlorate, calcium perchlorate and strontium perchlorate. The concentration range should be from 10% to 70% by weight for iodide and 0 to 70% by weight for oxyiodide.

Many of the above iodates may be prepared by either reacting iodic acid and the metal hydroxide followed by evaporation of the water, or by reacting sodium iodate with the metal nitrate, washing the metal iodate precipitate thoroughly, and drying.

It should be noted that the alkaline metal iodates and sodium monoxide mixtures will not ignite with water in compressed form without the presence of an alkaline earth chlorate or perchlorate. The lithium iodate formulations will give off iodine vapor in some instances. Formulations with potassium iodate are the least active of the alkaline metal iodate series. Some magnesium iodate formulations will give off iodine vapor. Commercial grade calcium iodate will give off $I_2$ vapor, while laboratory synthesized material will not, probably due to impurities. Zinc iodate and zinc perchlorate promote small amounts of iodine vapor. Mixtures of sodium iodide and sodium monoxide ignite spontaneously upon addition of zinc perchlorate. When used with alkali metal iodates, the alkaline earth perchlorates perform best.

Some care is required in manufacturing generators with these ignition cones. Because of the extremely deliquescent nature of the materials, powder clinging to the sides of the mold can absorb moisture from the air. When fresh cone material is added, the moisture can cause a spontaneous reaction. By keeping the laboratory air dry and the mold clean, this can be prevented.

With respect to water initiation, the mechanism by which water activates the first fire is not presently understood. All the iodate formulations described herein can be activated by water when they are loose powder. Some formulations can be ignited with water when they have been pressed into a generator cone. Where the generator is to be used under conditions which will cause water to either boil or freeze, the former can be prevented by sealing the water in a compartment which will sustain some internal pressure; the latter can be alleviated by adding a salt such as $CaCl_2$ to the water to lower the freezing point.

The water initiation reaction may simply be the exothermic reaction of sodium monoxide with water to form sodium hydroxide. Since the steam-sodium monoxide reaction would be more strongly exothermic than the liquid-solid reaction, the loose powder would allow steam to penetrate it, while a dense solid would not. However, when the sodium chlorate of Equation II above is replaced by barium chlorate or perchlorate, or the perchlorate of an alkaline earth metal, the cone will be initiated by liquid water when the mixture is in its compressed form. This may indicate that a sodium-hydrogen periodate (such as $Na_3H_2IO_6$) is formed in the loose powder and an alkaline earth-hydrogen periodate (such as $Ba_2HIO_6$) is formed in the compressed material. Most of the alkaline earth iodate formulations herein will also ignite with water in their compressed forms. More accurate basic thermodynamic information is required on the more complex periodates to clarify the mechanism involved.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Now that the invention has been described,
I claim as my invention:

1. A chemical oxygen generator comprising a canister, a chlorate candle in said canister, a water initiatable ignition composition on said candle, water-filled sealed means associated with said composition, and means accessible from outside of the canister for releasing water from the sealed means to ignite the ignition composition.

2. The generator of claim 1 wherein the water in the sealed means contains an additive for reducing the freezing point of the water.

3. An oxygen generator cell comprising an impervious container having an outlet for releasing oxygen, a chlorate candle in said container, a water initiatable ignition composition at one end of said candle in said container, a sealed water-filled member in said container adjacent said ignition composition, a pin actuatable from outside of said container for rupturing said member to release water to the ignition composition for igniting the composition and thereby to ignite the candle for generating oxygen, and filter means adjacent said outlet of the container to filter the oxygen flowing to the outlet.

4. An oxygen generator cell comprising a metal can, a chlorate candle in said can, a water initiatable ignition cone at an end of said candle, a sealed water container in said can adjacent said ignition cone, means actuatable from outside said can for rupturing said sealed container to release water to the cone for igniting the cone and thereby to ignite the candle for generating oxygen, and means in the can providing an outlet passage for said generated oxygen.

5. The oxygen generator cell of claim 4 wherein the sealed water container in the can is a water-filled fracturable vial.

6. A chemical oxygen generator comprising a canister having an outlet for releasing oxygen, a chlorate candle in said canister, a water initiatable ignition composition on said candle, water-filled sealed means in said canister associated with said composition, means accessible from outside of the canister for releasing water from the sealed means to ignite the ignition composition and thereby ignite the candle for generating oxygen to be released through said outlet, and said ignition composition comprising a compacted mixture of an oxidant of at least one member of the class consisting of the alkaline metal and the alkaline earth metal iodides and oxyiodides, a principal oxidizer consisting of at least one alkaline earth metal monoxide and, at least when an iodide is used as the oxidant, an auxiliary oxidizer comprising at least one member of the class consisting of the alkaline metal and the alkaline earth metal peroxides and chlorates including the perchlorates.

7. The generator of claim 6 wherein the water-filled sealed means is a water-filled fracturable vial.

8. The oxygen generator of claim 6 wherein the means accessible from outside of the canister for releasing the water is a pin.

References Cited
UNITED STATES PATENTS

| | | | |
|---|---|---|---|
| 2,455,975 | 12/1948 | Buehl et al. | 23—282 |
| 2,983,588 | 5/1961 | Bovard | 23—281 |
| 3,372,996 | 3/1968 | Barrett et al. | 23—282 |
| 3,615,252 | 10/1971 | DiPietro | 23—282 |
| 3,702,305 | 11/1972 | Thompson | 23—281 X |

BARRY S. RICHMAN, Primary Examiner

U.S. Cl. X.R.

23—282; 128—191 R, 203

UNITED STATES PATENT OFFICE
CERTIFICATE OF CORRECTION

Patent No. 3,806,323                    Dated April 23, 1974

Inventor(s) Tommy Lewis Thompson

It is certified that error appears in the above-identified patent and that said Letters Patent are hereby corrected as shown below:

Column 1, lines 4 and 5, cancel "Dow Chemical Investment and Finance Corporation, Midland, Michigan" and insert --Life Support, Inc., Melbourne, Fla.--.

Column 5, line 4, (equation I), cancel "$Na_5IO_5$" and insert --$Na_5IO_6$--.

Column 5, line 7, (equation II), cancel the entire line and insert --$NaIO_3 + 2Na_2O + 1/3\ NaClO_3 \longrightarrow Na_5IO_6 + 1/3\ NaCl$--.

Column 5, line 11, (equation IV) cancel the entire line and insert --$4/3\ NaIO_3 + 2Na_2O \longrightarrow Na_5IO_6 + 1/3\ NaI$--.

Column 5, line 35, cancel "iodine" and insert --iodide--.

Signed and sealed this 17th day of September 1974.

(SEAL)
Attest:

McCOY M. GIBSON JR.                    C. MARSHALL DANN
Attesting Officer                       Commissioner of Patents